United States Patent
Sun et al.

(10) Patent No.: US 12,223,633 B2
(45) Date of Patent: Feb. 11, 2025

(54) FABRIC DEFECT DETECTION METHOD BASED ON MULTI-MODAL DEEP LEARNING

(71) Applicant: Tsinghua University, Beijing (CN)

(72) Inventors: Fuchun Sun, Beijing (CN); Bin Fang, Beijing (CN); Huaping Liu, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 17/281,923

(22) PCT Filed: Aug. 26, 2020

(86) PCT No.: PCT/CN2020/111380
§ 371 (c)(1),
(2) Date: Mar. 31, 2021

(87) PCT Pub. No.: WO2021/098323
PCT Pub. Date: May 27, 2021

(65) Prior Publication Data
US 2022/0414856 A1     Dec. 29, 2022

(30) Foreign Application Priority Data
Dec. 19, 2019 (CN) .......................... 201911130805.7

(51) Int. Cl.
    *G06T 7/00*        (2017.01)
    *G06V 10/764*     (2022.01)
    *G06V 10/774*     (2022.01)
(52) U.S. Cl.
    CPC .......... *G06T 7/0004* (2013.01); *G06V 10/764* (2022.01); *G06V 10/774* (2022.01);
(Continued)

(58) Field of Classification Search
    CPC ......... G06T 7/0004; G06T 2207/30124; G06T 2207/20081; G06T 2207/20084;
(Continued)

(56) References Cited

U.S. PATENT DOCUMENTS

2023/0234137 A1\*    7/2023   Reutzel ................. B22F 10/366
                                                                             382/141

FOREIGN PATENT DOCUMENTS

CN         108052911 A   \*   5/2018
CN         11566118 A    \*   1/2023

\* cited by examiner

*Primary Examiner* — Hoa Q Pham
(74) *Attorney, Agent, or Firm* — Hemisphere Law, PLLC; Zhigang Ma

(57) ABSTRACT

The present invention proposes a fabric defect detection method based on multi-modal deep learning. First, a tactile sensor is placed onto the fabric surface with different defects to collect the fabric texture images, a camera is used to collect the corresponding fabric external images, and a fabric external image and a fabric texture image constitute a set of fabric detection data; then, a feature extraction network and a multi-modal fusion network are connected to establish a classification model based on multi-modal deep learning, which uses the fabric texture image and fabric external image in each set of collected fabric detection data as input, and the fabric defect as output; said classification model is trained using the collected fabric detection data; finally, the trained classification model is used to detect the fabric defect. The present invention employs vision-touch complementary information, which can greatly improve the accuracy and robustness of detection.

3 Claims, 1 Drawing Sheet

(52) U.S. Cl.
CPC .............. *G06T 2207/20081* (2013.01); *G06T 2207/20084* (2013.01); *G06T 2207/30124* (2013.01)

(58) Field of Classification Search
CPC ..... G06V 10/764; G06V 10/774; B22F 10/85; B22F 10/38; B22F 10/366; B22F 12/90
USPC ................ 356/238.1, 238.2, 238.3, 429–431
See application file for complete search history.

FABRIC DEFECT DETECTION METHOD BASED ON MULTI-MODAL DEEP LEARNING

FIELD OF THE INVENTION

The present invention discloses a fabric defect detection method based on multi-modal deep learning, which falls under the technical field of fabric defect detection.

BACKGROUND OF THE INVENTION

The defect detection is an indispensable link in the production of fabrics, which directly determines the value of the fabrics. Fabric defects refer to structural defects such as missing and protruding threads caused by mistakes of textile machines during the spinning process due to some factors, or uneven dyeing during the dyeing process. Such defects will reduce the aesthetics and comfort of clothes made from the fabrics.

At present, most domestic enterprises still use the method of human eye recognition to detect fabric defects. However, this method requires inspectors' rich training and practical experience, and it may result in low efficiency and inconsistent detection standards in the detection process. This will lower the production efficiency, and cause uneven fabric quality.

In order to overcome the shortcomings of manual detection, fabric defect detection methods based on the deep learning have been developed, such as a deep learning-based fabric defect detection method disclosed by Nanjing University of Posts and Telecommunications (application number: 201910339022.3). This method uses the ResNet network and the Fast R-CNN network to train based on a high-definition fabric detection image library. However, this method doesn't apply to recognition of fabric images with dyeing defects. In addition, uneven color changes have a very large impact on the neural network, and they may lead the neural network to extract a large number of wrong features, thus causing misjudgment of structural defects. At the same time, since small structural defects also need to be detected, this method requires high image resolution, but it is difficult to capture such accurate and high-quality images in a complex industrial production environment.

SUMMARY OF THE INVENTION

The objective of the present invention is to solve the existing drawbacks in fabric defect detection, and propose a fabric defect detection method based on multi-modal deep learning. The tactile sensor is used to identify structural defects on the surface of the fabric, regardless of changes in the fabric color and external light environment. Combined with the fabric images collected by the external camera, color defects of the fabric can be identified. The multi-modal deep learning method used in the present invention mixes said information to greatly improve the accuracy and robustness of detection.

To achieve the above objective, the present invention adopts the following technical solutions:

A fabric defect detection method based on multi-modal deep learning proposed in the present invention, characterized in that it comprises the following steps:

Step 1: Establish a fabric detection data set based on different types of defects A tactile sensor is placed onto the fabric surface with different defects to collect the fabric texture images. The fabric defects are divided into normal, structural defects and color defects. Said structural defects include scraping, thinning, neps, holes, rovings, creases and running stitches, and said color defects include dirt, skilteriness, colored yarns, uneven dyes, black dots, skip printing and dark stripes. A camera is used to collect the external images of the fabric at the same position and the same angle where the tactile sensor collects the fabric texture. An external image of the fabric and its corresponding texture image are taken as a set of fabric detection data, and the fabric defect is seen as the label of each image, that is, each set of fabric defect detection data includes one fabric texture image, one fabric external image and one defect label. All sets of collected fabric detection data constitute a fabric detection data set;

Step 2: Establish a classification model based on multi-modal deep learning

A feature extraction network and a multi-modal fusion network are connected to establish a classification model based on multi-modal deep learning. Said feature extraction network employs two parallel ResNet-50 networks, which respectively use the fabric texture image and fabric external image in each set of collected fabric detection data as input to extract the features of the fabric texture image and fabric external image. Two vectors with the length of N are obtained, and then connected to a vector with the length of 2N as the extracted feature vector output. Said multi-modal fusion network adopts 2 to 4 layers of fully connected networks to detect fabric defects. The output of the previous layer of fully connected network is used as the input of the subsequent layer of fully connected network. The input of the first layer of fully connected network is the feature vector with the length of 2N obtained by said feature extraction network, and the output of the last layer of fully connected network is the feature vector characterizing the fabric defect, the length of which is equal to the number of defect label types contained in the input set of fabric detection data, and each element of which represents the probability of each fabric defect;

Step 3: Train the fabric defect detection model

The fabric detection data sets obtained in step 1 are classified into training set and test set. The fabric texture image and fabric external image under the same set of fabric detection data in the training set are respectively input into the two parallel ResNet-50 networks of the classification model established in step 2. Afterwards, the back propagation algorithm is used to train the fabric detection model, and the loss function Softmax Loss is used to constrain the training process of the fabric detection model. The test set is used to judge the training effect of the fabric defect detection model. Finally, a trained fabric detection model is obtained;

Step 4: Texture images of the fabric to be detected and their corresponding external images are collected and input into the trained fabric defect detection model to detect the defect of the fabric. This defect is the highest-confidence defect label in the feature vectors that are output by the fabric defect detection model to characterize the fabric defects.

Further, in step 3, the fabric detection data set divided into the training set and the test set is replaced by an extended fabric detection data set which is obtained by the following steps: take any group of data in the fabric detection data set obtained in step 1, and randomly perform the same data enhancement operations (rotation and translation) on the fabric texture image and the fabric external image to generate a group of new data; continue said data enhancement operations on the remaining groups of data in the fabric detection data set respectively; and add all the groups of new data to the fabric detection data set to obtain the extended fabric detection data set.

Features and Beneficial Effects of the Invention:

The present invention proposes a fabric defect detection method based on multi-modal deep learning. A tactile sensor is used to capture the fabric surface texture, which can detect structural defects without being affected by the fabric color and the external light environment. A multi-modal deep learning method is used to combine said fabric surface texture with the images taken by the external camera. Since external images can also display some structural defect features when identifying the fabric cloth defects, the mixed use of such complementary information can greatly improve the accuracy of structural defect detection.

DESCRIPTION OF THE INVENTION

Figure 1:
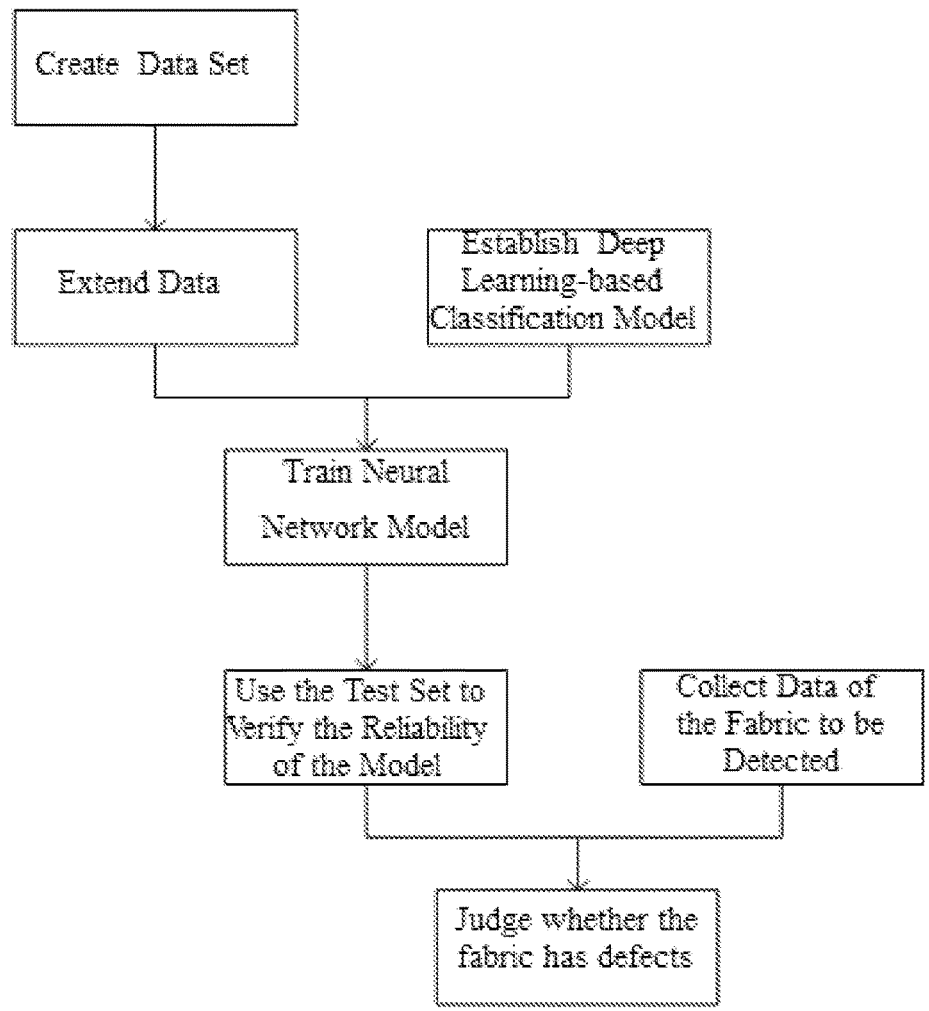
FIG. 1 is a flowchart of the fabric defect detection method in this embodiment.
Figure 2:
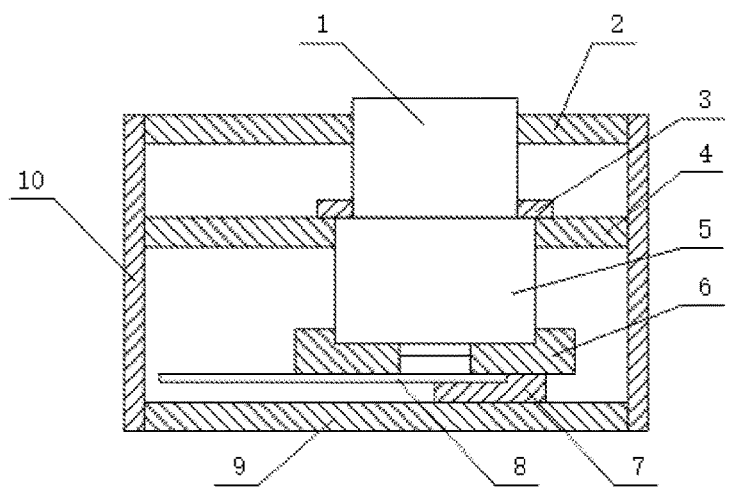
FIG. 2 is a schematic diagram of the tactile sensor used in this embodiment.

A fabric defect detection method based on multi-modal deep learning disclosed in the present invention is described in detail as follows in conjunction with the drawings and embodiments:

With reference to FIG. 1, the overall flowchart in the embodiment of the present invention includes the following steps:

Step 1: Establish a fabric detection data set based on different types of defects A tactile sensor is placed onto the fabric surface with different defects to collect the fabric texture images. The fabric defects are divided into normal, structural defects and color defects. Said structural defects include scraping, thinning, neps, holes, rovings, creases and running stitches, and said color defects include dirt, skilteriness, colored yarns, uneven dyes, black dots, skip printing and dark stripes. A camera is used to collect the external images of the fabric at the same position and the same angle where the tactile sensor collects the fabric texture. An external image of the fabric and its corresponding texture image are taken as a set of fabric detection data, and the fabric defect is seen as the label of each image, that is, each set of fabric defect detection data includes one fabric texture image, one fabric external image and one defect label. All sets of collected fabric detection data constitute a fabric detection data set after cutting out edges;

With reference to FIG. 2, the tactile sensor used in this step consists of a housing 10 composed of a U-shaped base 9 and a top cover 2, a transparent elastomer 1, a light emitter 3, and a camera 8, the latter three all being contained in the housing 10. The camera 8 is mounted on the base 9 of the housing 10 through a first support plate 7. Above the camera 8 is a transparent support block 5, the bottom of which is fixed with a second support plate 6 connected to the first support plate 7, and the top of which is limited by a third support plate 4 fixed to a side wall in the middle of the housing 10. The top of the transparent elastomer 1 protrudes from the top cover 2 of the housing 10, and the bottom is in contact with the top of the transparent support block 5. The transparent elastomer 1 is a rectangular block made of transparent polydimethylsiloxane (PDMS). The softness of the elastomer can be adjusted by mixing different amounts of PDMS and curing agents (the specific production process is well-known in this field). The elastomer features low elastic modulus, high repeatability and metal adhesion. The top surface of the transparent elastomer 1 is sputtered with a metal aluminum film (the thickness of the metal aluminum film in this embodiment is 2000 A), which can map the surface texture of a fabric when in contact with the fabric. The surface texture is collected by the camera 8. The light emitter 3 is evenly distributed around the bottom of the transparent elastomer 1, and supported by the third support plate 4. The light emitter 3 is used to provide stable and uniform light for the transparent elastomer 1 to avoid detection error caused by changes in brightness of the natural light. The light emitter 3 in this embodiment uses LED lights and matching circuit boards, specifically, 8 white SMD LED lights uniformly arranged around the transparent elastomer 1, with the total voltage of less than 4V.

The camera used in this step is a commercial camera. This embodiment uses an area-array camera (MV-CA050-11UC). The collected fabric external images are used to reflect the defects of the fabric as a whole.

The tactile sensor and the camera are both controlled by a mechanical arm to realize their respective image collection.

Step 2: Establish a classification model based on multi-modal deep learning

A feature extraction network and a multi-modal fusion network are connected to establish a classification model based on multi-modal deep learning. Said feature extraction network employs two parallel ResNet-50 networks, which respectively use the fabric texture image and fabric external image in each set of collected fabric detection data as input to extract the features of the fabric texture image and fabric external image. Two vectors with the length of N (1,000 is selected in this embodiment) are obtained, and then connected to a vector with the length of 2N as the extracted feature vector output. This vector contains both feature information in texture images and external images, is input into the multi-modal fusion network to detect fabric defects. Said multi-modal fusion network adopts 2 to 4 layers of fully connected networks to detect fabric defects (three layers of fully connected networks are selected in this embodiment). The output of the previous layer of fully connected network is used as the input of the subsequent layer of fully connected network. The input of the first layer of fully connected network is the feature vector with the length of 2N obtained by said feature extraction network, and the output of the last layer of fully connected network is the feature vector characterizing the fabric defect, the length of which is equal to the number of defect label types contained in the input set of fabric detection data, and each element of which represents the probability of each fabric defect. In this embodiment, the input of the first layer of fully connected network is the feature vector with the length of 2,000 obtained by said feature extraction network, and the output is the feature vector with the length of 1,024; the output of the first layer of fully connected network is used as the input of the second layer of fully connected network, and the output of the second layer of fully connected network is the feature vector with the length of 1,024.

Step 3: Perform data enhancement operations to extend the fabric detection data set obtained in step 1

Enhance all collected data: take any group of data in the fabric detection data set obtained in step 1, and randomly perform the same data enhancement operations (rotation and translation) on the fabric texture image and the fabric external image to generate a group of new data; perform said data enhancement operations on the remaining groups of data in the fabric detection data set respectively; and add all the groups of new data to the fabric detection data set to obtain an extended fabric detection data set, used for subsequent training of the network model.

If data in the fabric detection data set obtained in step 1 is sufficient, step 3 can be defaulted.

Step 4: Train the fabric defect detection model

First, the extended fabric detection data set obtained in step 3 (or the fabric detection data set obtained in step 1 when the step 3 is defaulted) is classified into the training set and the test set. In this embodiment, the ratio of training set to test set is 9:1. The fabric texture image and fabric external image under the same set of fabric detection data in the training set are respectively input into the two feature extraction networks of the classification model established in step 2. Afterwards, the back propagation algorithm is used to train the fabric detection model, and the loss function Softmax Loss is used to constrain the training process of the fabric detection model. The test set is used to judge the training effect of the fabric defect detection model, and assist the adjustment of network model parameters to obtain a trained fabric detection model.

Step 5: Texture images of the fabric to be detected and their corresponding external images are collected and input into the trained fabric defect detection model to detect the defect of the fabric. This defect is the highest-confidence defect label in the feature vectors that are output by the fabric defect detection model to characterize the fabric defects.

As for fabrics to be detected, the method described in step 1 is used to collect their texture images and external images, which are then input into the fabric detection model trained in step 4. The defects of the fabrics are judged through the output results.

In summary, the fabric defect detection method proposed in the present invention achieves the function of fabric defect detection based on the simultaneous detection by the tactile sensor and the camera and the vision-touch double-modal deep learning algorithm. The high-accuracy tactile sensor can detect defects of finer fabrics or colored fabrics that are difficult to identify with the naked eye, and applies to detect defects of various fabrics. External images can provide information on fabric color defects and assist the tactile sensor to offer some structural defect information. The combination of complementary vision-touch information can greatly improve the accuracy and robustness of detection.

The above is only the embodiment of the present invention, but it does not limit the protection scope of the present invention. Any equivalent structure or equivalent process transformed from the content of the specification and drawings of the present invention, or direct or indirect use of the content of the specification and drawings of the present invention in other related technical fields are all included in the protection scope of the present invention in the same way.

The invention claimed is:

1. A fabric defect detection method based on multi-modal deep learning, wherein the fabric defect detection method comprises:
    step 1: establishing a fabric detection data set based on different types of defects, comprising:
        placing a tactile sensor onto surfaces of fabrics with different fabric defects to collect fabric texture images, the different fabric defects comprises normal, structural defects and color defects, the structural defects comprise scraping, thinning, neps, holes, rovings, creases and running stitches, and the color defects comprise dirt, skilteriness, colored yarns, uneven dyes, black dots, skip printing and dark stripes;
        using an external camera to collect fabric external images of the fabrics at same positions and same angles where the tactile sensor collects the fabric texture images, taking each of the fabric external images and a corresponding one fabric texture image of the fabric texture images as a set of fabric detection data to thereby obtain sets of fabric detection data, and taking a corresponding fabric defect of the different fabric defects as a defect label for the fabric external image and the corresponding one fabric texture image, and each set of the sets of fabric detection data comprises one fabric texture image, one fabric external image and one defect label; and
        taking the sets of fabric detection data as the fabric detection data set;
    step 2: establishing a classification model based on multi-modal deep learning, comprising:
        connecting a feature extraction network and a multi-modal fusion network to establish the classification model based on multi-modal deep learning, wherein the feature extraction network comprises two parallel ResNet-50 networks, the two parallel ResNet-50 networks are configured to: respectively use the one fabric texture image and the one fabric external image in each set of the sets of fabric detection data as inputs to extract features of the one fabric texture image and one fabric external image to thereby obtain two vectors each with a length of N, where "N" is defined, and connect the two vectors to obtain a vector with a length of 2N as an extracted feature vector output; the multi-modal fusion network adopts 2 to 4 layers of fully connected networks to detect fabric defects; an output of a previous layer of the 2 to 4 layers of fully connected networks is used as an input of a subsequent layer of the 2 to 4 layers of fully connected networks, an input of a first layer of the 2 to 4 layers of fully connected networks is the extracted feature vector output with the length of 2N obtained by the feature extraction network, an output of a last layer of the 2 to 4 layers of fully connected networks is a feature vector characterizing the fabric defects, a length of the feature vector characterizing the fabric defects is equal to a type number of the one defect label contained in the each set of the sets of fabric detection data, and each element of the feature vector characterizing the fabric defects represents a probability of each of the fabric defects;
    step 3: training a fabric defect detection model, comprising:
        classifying the fabric detection data set obtained in the step 1 into a training set and a test set;
        inputting a fabric texture image and a fabric external image under a same set of fabric detection data in the training set into the two parallel ResNet-50 networks of the classification model established in the step 2, respectively;
        using a back propagation algorithm to train the fabric defect detection model; using a loss function Softmax Loss to constrain a training process of the fabric defect detection model; using the test set to determine a training effect of the fabric defect detection model to thereby obtain a trained fabric defect detection model; and step 4: collecting fabric texture images of a fabric to be detected and corresponding fabric external images of the fabric to be detected, inputting the fabric texture images of the fabric to be detected and the corresponding fabric external images of the fabric to be detected into the trained fabric defect detection model to detect a fabric defect of the fabric to be detected, wherein defect is a highest-confidence defect label in a feature vector characterizing fabric defects that is output by the trained fabric defect detection model.

2. The fabric defect detection method according to claim 1, wherein the tactile sensor consists of a housing composed of a base and a top cover, a transparent elastomer, a light emitter, and a camera, the transparent elastomer, the light emitter, and the camera are contained in the housing; the camera is mounted on the base through a first support plate, a transparent support block is disposed above the camera, a bottom of the transparent support block is fixed with a second support plate connected to the first support plate, and a top of the transparent support block is limited by a third support plate fixed to a middle of a side wall of the housing; a top of the transparent elastomer protrudes from the top cover, and a bottom of the transparent elastomer is in contact with the top of the transparent support block; a top surface of the transparent elastomer is sputtered with a metal aluminum film, the metal aluminum film is used to map a surface texture of a target fabric when the metal aluminum film is in contact with the target fabric, the surface texture is collected by the camera; and the light emitter is evenly distributed around the bottom of the transparent elastomer, and supported by the third support plate.

3. The fabric defect detection method according to claim 1, wherein, in the step 3, the fabric detection data set classified into the training set and the test set is replaced by an extended fabric detection data set, and the extended fabric detection data set is obtained by the following steps: for one group of data in the fabric detection data set obtained in the step 1, and performing data enhancement operations comprising rotation and translation operations on each of a fabric texture image and a fabric external image of the one group of data to generate one group of new data; performing the data enhancement operations on each of remaining groups of data in the fabric detection data set to obtain multiple groups of new data; and adding all the groups of new data comprising the one group of new data and the multiple groups of new data to the fabric detection data set to obtain the extended fabric detection data set.

* * * * *